(12) United States Patent
Frenkel et al.

(10) Patent No.: US 9,116,857 B2
(45) Date of Patent: *Aug. 25, 2015

(54) SECURE ARCHIVE

(71) Applicant: WATERFALL SECURITY SOLUTIONS LTD., Rosh HaAyin (IL)

(72) Inventors: Lior Frenkel, Moshav Misgav Dov (IL); Amir Zilberstein, Yad Rambam (IL)

(73) Assignee: WATERFALL SECURITY SOLUTIONS LTD., Rosh Haayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,419

(22) Filed: Apr. 9, 2014

(65) Prior Publication Data

US 2014/0244780 A1 Aug. 28, 2014

Related U.S. Application Data

(63) Continuation of application No. 12/447,470, filed as application No. PCT/IL2008/000070 on Jan. 16, 2008, now Pat. No. 8,756,436.

(30) Foreign Application Priority Data

Jan. 16, 2007 (IL) .......................................... 180748

(51) Int. Cl.
*H04L 29/06* (2006.01)
*G06F 15/173* (2006.01)
*G06F 12/14* (2006.01)

(52) U.S. Cl.
CPC ...... *G06F 15/17331* (2013.01); *G06F 12/1408* (2013.01); *H04L 63/0485* (2013.01)

(58) Field of Classification Search
CPC .......... G06F 12/1408; G06F 15/17331; G06F 21/42; G06F 21/78; G06F 21/79; G06F 21/85; H04L 9/3215
USPC ............................ 713/193; 380/277; 711/163
See application file for complete search history.

(56) References Cited

U.S. PATENT DOCUMENTS

| | | | | | |
|---|---|---|---|---|---|
| 4,163,289 | A | * | 7/1979 | Schmidt | 365/51 |
| 4,213,177 | A | * | 7/1980 | Schmidt | 710/307 |
| 4,214,302 | A | * | 7/1980 | Schmidt | 710/307 |
| 4,375,665 | A | * | 3/1983 | Schmidt | 710/307 |
| 4,964,046 | A | * | 10/1990 | Mehrgardt et al. | 712/36 |
| 4,987,595 | A | * | 1/1991 | Marino et al. | 713/164 |
| 5,163,138 | A | * | 11/1992 | Thirumalai | 710/316 |
| 5,185,877 | A | * | 2/1993 | Bissett et al. | 710/22 |
| 5,289,478 | A | * | 2/1994 | Barlow et al. | 714/770 |

(Continued)

OTHER PUBLICATIONS

IBM Technical Disclosure Bulletin, Separate Write/Read Logical Paths to Optimize Library Network File System Data Rates, vol. 37, No. 09, Sep. 1994.*

(Continued)

*Primary Examiner* — David García Cervetti
(74) *Attorney, Agent, or Firm* — D. Kligler I.P. Services Ltd.

(57) ABSTRACT

Storage apparatus (20) includes a memory (30) and an encryption processor (28), which is configured to receive and encrypt data transmitted from one or more computers (24) for storage in the memory. A one-way link (32) couples the encryption processor to the memory so as to enable the encryption processor to write the encrypted data to the memory but not to read from the memory.

18 Claims, 1 Drawing Sheet

(56) References Cited

U.S. PATENT DOCUMENTS

| | | | |
|---|---|---|---|
| 5,530,758 A * | 6/1996 | Marino et al. | 713/150 |
| 5,677,952 A * | 10/1997 | Blakley et al. | 713/189 |
| 5,732,278 A * | 3/1998 | Furber et al. | 712/41 |
| 5,748,871 A * | 5/1998 | DuLac et al. | 714/5.1 |
| 5,815,577 A | 9/1998 | Clark | |
| 5,829,046 A * | 10/1998 | Tzelnic et al. | 711/162 |
| 5,940,507 A * | 8/1999 | Cane et al. | 713/165 |
| 5,946,399 A * | 8/1999 | Kitaj et al. | 713/189 |
| 5,995,628 A * | 11/1999 | Kitaj et al. | 713/164 |
| 6,026,502 A | 2/2000 | Wakayama | |
| 6,167,459 A * | 12/2000 | Beardsley et al. | 710/3 |
| 6,170,023 B1 | 1/2001 | Beardsley et al. | 710/36 |
| 6,185,638 B1 * | 2/2001 | Beardsley et al. | 710/36 |
| 6,202,095 B1 * | 3/2001 | Beardsley et al. | 709/227 |
| 6,239,810 B1 * | 5/2001 | Van Hook et al. | 345/420 |
| 6,467,009 B1 * | 10/2002 | Winegarden et al. | 710/305 |
| 6,574,640 B1 * | 6/2003 | Stahl | 707/661 |
| 6,601,126 B1 * | 7/2003 | Zaidi et al. | 710/305 |
| 6,615,244 B1 * | 9/2003 | Singhal | 709/213 |
| 6,862,663 B1 * | 3/2005 | Bateman | 711/133 |
| 6,915,369 B1 * | 7/2005 | Dao et al. | 710/305 |
| 6,915,435 B1 * | 7/2005 | Merriam | 726/5 |
| 6,957,330 B1 * | 10/2005 | Hughes | 713/163 |
| 6,966,001 B2 * | 11/2005 | Obara et al. | 726/26 |
| 7,062,587 B2 * | 6/2006 | Zaidi et al. | 710/305 |
| 7,069,437 B2 | 6/2006 | Williams | |
| 7,171,566 B2 * | 1/2007 | Durrant | 713/189 |
| 7,200,693 B2 * | 4/2007 | Jeddeloh | 710/22 |
| 7,254,663 B2 * | 8/2007 | Bartley et al. | 710/305 |
| 7,269,704 B2 * | 9/2007 | Matulik et al. | 711/167 |
| 7,441,102 B2 * | 10/2008 | Shade | 712/205 |
| 7,660,959 B2 * | 2/2010 | Asher et al. | 711/164 |
| 7,685,436 B2 * | 3/2010 | Davis et al. | 713/192 |
| 7,698,470 B2 * | 4/2010 | Ruckerbauer et al. | 710/14 |
| 7,761,529 B2 * | 7/2010 | Choubal et al. | 709/212 |
| 7,761,704 B2 * | 7/2010 | Ho et al. | 713/158 |
| 7,792,300 B1 * | 9/2010 | Caronni | 380/277 |
| 7,814,316 B1 * | 10/2010 | Hughes et al. | 713/160 |
| 7,815,548 B2 * | 10/2010 | Barre et al. | 482/9 |
| 7,845,011 B2 * | 11/2010 | Hirai | 726/26 |
| 7,849,330 B2 * | 12/2010 | Osaki | 713/193 |
| 7,941,828 B2 | 5/2011 | Jauer | |
| 8,756,436 B2 * | 6/2014 | Frenkel et al. | 713/193 |
| 2002/0065775 A1 * | 5/2002 | Monaghan | 705/43 |
| 2002/0083120 A1 * | 6/2002 | Soltis | 709/200 |
| 2002/0112181 A1 | 8/2002 | Smith | |
| 2003/0037247 A1 * | 2/2003 | Obara et al. | 713/193 |
| 2003/0140239 A1 * | 7/2003 | Kuroiwa et al. | 713/193 |
| 2003/0188102 A1 * | 10/2003 | Nagasoe et al. | 711/114 |
| 2003/0200460 A1 | 10/2003 | Morota et al. | |
| 2004/0022107 A1 * | 2/2004 | Zaidi et al. | 365/202 |
| 2004/0181679 A1 | 9/2004 | Dettinger et al. | |
| 2004/0198494 A1 | 10/2004 | Nguyen et al. | |
| 2004/0250096 A1 | 12/2004 | Cheung et al. | |
| 2005/0060693 A1 | 3/2005 | Robison et al. | |
| 2005/0119967 A1 * | 6/2005 | Ishiguro et al. | 705/38 |
| 2005/0120251 A1 * | 6/2005 | Fukumori | 713/300 |
| 2005/0122930 A1 | 6/2005 | Zhao et al. | |
| 2005/0138434 A1 | 6/2005 | Catherman et al. | |
| 2005/0216648 A1 * | 9/2005 | Jeddeloh | 710/311 |
| 2006/0026292 A1 | 2/2006 | Namioka et al. | |
| 2006/0047887 A1 * | 3/2006 | Jeddeloh | 711/100 |
| 2006/0064550 A1 * | 3/2006 | Katsuragi et al. | 711/141 |
| 2006/0085354 A1 * | 4/2006 | Hirai | 705/59 |
| 2006/0095629 A1 * | 5/2006 | Gower et al. | 710/305 |
| 2006/0155939 A1 | 7/2006 | Nagasoe et al. | |
| 2006/0165108 A1 | 7/2006 | Uysal | |
| 2006/0179208 A1 * | 8/2006 | Jeddeloh | 711/100 |
| 2006/0224848 A1 * | 10/2006 | Matulik et al. | 711/167 |
| 2006/0259431 A1 * | 11/2006 | Poisner | 705/51 |
| 2006/0288010 A1 * | 12/2006 | Chen et al. | 707/9 |
| 2006/0294295 A1 * | 12/2006 | Fukuzo | 711/105 |
| 2007/0028027 A1 * | 2/2007 | Janzen et al. | 711/5 |
| 2007/0043769 A1 * | 2/2007 | Kasahara et al. | 707/104.1 |
| 2007/0055814 A1 * | 3/2007 | Jeddeloh | 711/100 |
| 2007/0150752 A1 | 6/2007 | Kudelski | |
| 2007/0192608 A1 | 8/2007 | De Arruda Villela | |
| 2007/0204140 A1 * | 8/2007 | Shade | 712/220 |
| 2007/0283297 A1 * | 12/2007 | Hein et al. | 716/1 |
| 2008/0008207 A1 | 1/2008 | Kellum | |
| 2008/0066192 A1 * | 3/2008 | Greco et al. | 726/32 |
| 2008/0082835 A1 * | 4/2008 | Asher et al. | 713/193 |
| 2008/0144821 A1 | 6/2008 | Armstrong | |
| 2008/0155273 A1 * | 6/2008 | Conti | 713/190 |
| 2009/0019325 A1 * | 1/2009 | Miyamoto et al. | 714/702 |
| 2010/0275039 A1 * | 10/2010 | Frenkel et al. | 713/193 |
| 2011/0107023 A1 * | 5/2011 | McCallister et al. | 711/111 |
| 2011/0213990 A1 * | 9/2011 | Poisner | 713/193 |
| 2013/0297935 A1 | 11/2013 | Oswalt | |
| 2013/0326132 A1 * | 12/2013 | Jeddeloh | 711/105 |
| 2014/0007194 A1 | 1/2014 | Tucker et al. | |
| 2014/0040679 A1 * | 2/2014 | Shimizu et al. | 714/54 |
| 2014/0122965 A1 * | 5/2014 | Zeng et al. | 714/758 |

OTHER PUBLICATIONS

U.S. Appl. No. 13/487,265 Office Action dated Mar. 6, 2014.
EP Patent Application # 13182696.8 Search Report dated Apr. 3, 2014.
EP Patent Application # 06832267.6 Search Report dated Jun. 3, 2014.
U.S. Appl. No. 12/306,692 Office Action Dated Aug. 12, 2014.
U.S. Appl. No. 13/604,677 Office Action dated Aug. 13, 2014.
EP Patent Application # 14162141.7 Search Report dated Jun. 3, 2014.
U.S. Appl. No. 12/518,276 Office Action dated Sep. 29, 2014.
U.S. Appl. No. 14/512,496 Office Action dated Jan. 23, 2015.
U.S. Appl. No. 13/604,677 Office Action dated Feb. 26, 2015.
U.S. Appl. No. 12/518,276 Office Action dated May 22, 2015.

* cited by examiner

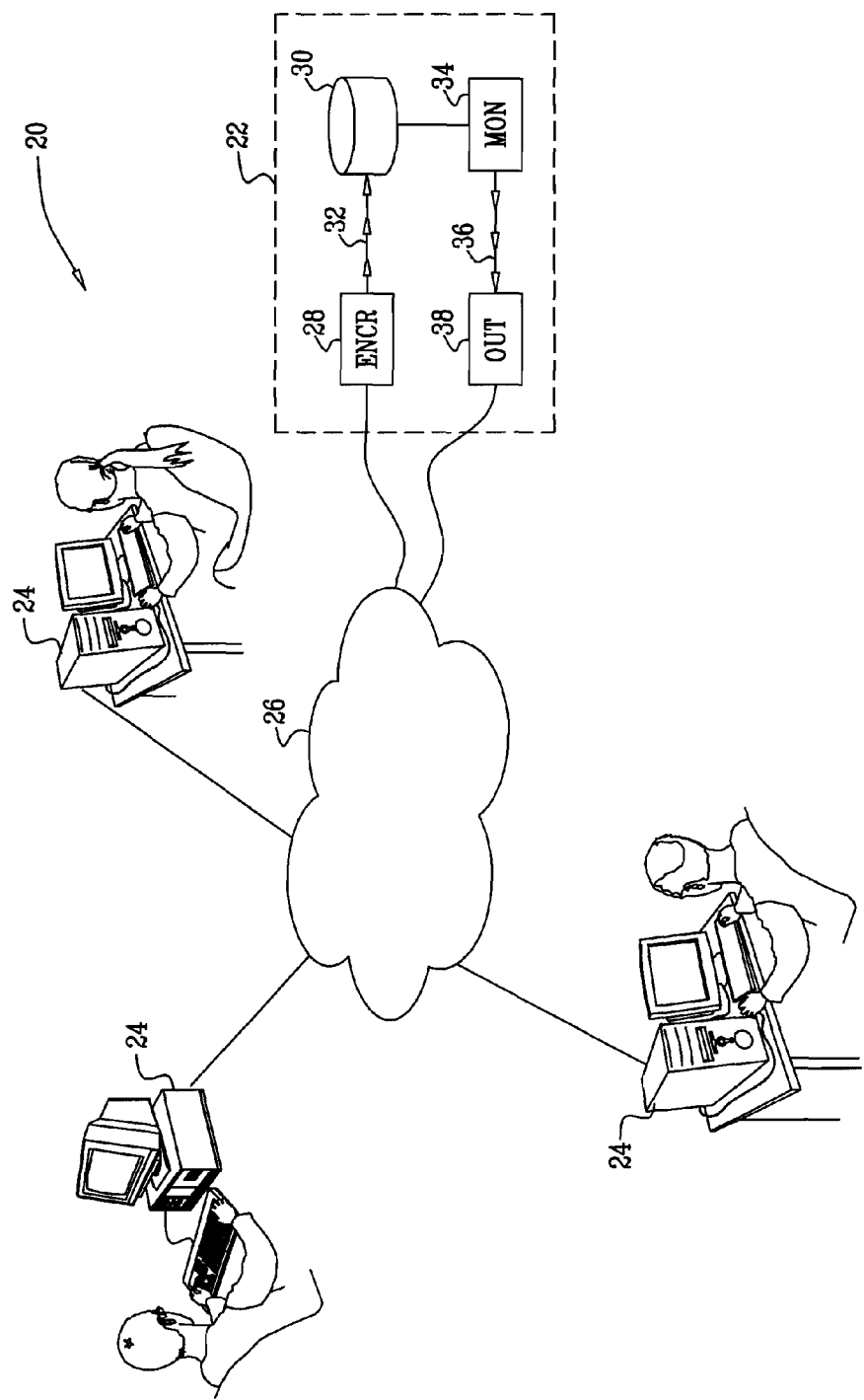

SECURE ARCHIVE

CROSS-REFERENCE TO RELATED APPLICATION

This application is a continuation of U.S. patent application Ser. No. 12/447,470, now U.S. Pat. No. 8,756,436, filed Apr. 28, 2009, in the national phase of PCT patent application PCT/IL2008/000070, filed Jan. 16, 2008.

FIELD OF THE INVENTION

The present invention relates generally to computer systems, and specifically to systems and methods for data communication and storage.

BACKGROUND OF THE INVENTION

In a computer network handling sensitive data, such as data in military or financial environments, portions of the network may be connected by one-way data links. For example, confidential data that must not be accessed from external sites may be stored on a computer that is configured to receive data over a one-way link and has no physical outgoing link over which data might be transmitted to the external site.

One-way links may be implemented, for example, using Waterfall™ systems, which are manufactured by Gita Technologies, Ltd. (Rosh HaAyin, Israel). Specifications of Waterfall systems are available at www.waterfall.co.il. The Waterfall system provides a physical one-way connection based on fiberoptic communication, using an underlying proprietary transfer protocol. When a transmitting computer is connected by a Waterfall system (or other one-way link) to a receiving computer, the receiving computer can receive data from the transmitting computer but has no means of sending any return communications to the transmitting computer.

SUMMARY OF THE INVENTION

Networked computing systems, such as enterprise computer networks, often use centralized storage for archiving of data, such as transaction logs, information technology (IT) system events, and backups. Maintaining the integrity of such archives is crucial in order to ensure that functions such as log analysis, audits, forensics, and data recovery after system failures can be carried out. It is also necessary to prevent unauthorized parties from accessing sensitive archived data.

The embodiments of the present invention that are described hereinbelow address these needs by providing a secure storage system, in which computers on a network can write data to a memory only via an encryption processor. (The term "memory" is used broadly in the present patent application and in the claims to refer to any sort of data storage medium.) The processor encrypts the data using an encryption key, which typically is not available to the source computers, and conveys the encrypted data over a one-way link to the memory. Thus, the encryption processor is able to write encrypted data to the memory but not to read from the memory.

Since all data written to the memory are encrypted, any malicious program code that a hacker may attempt to introduce into the storage system is scrambled and therefore rendered harmless until it is decrypted. Decryption may take place in a controlled, "sterile" environment, in which malicious code can be detected and neutralized before it affects vulnerable network elements. For example, the storage contents may be duplicated and then decrypted in an environment that is separate from the storage system, so that any damage that may be caused by malicious code will not affect the original stored data.

There is therefore provided, in accordance with an embodiment of the present invention, storage apparatus, including:
    a memory;
    an encryption processor, which is configured to receive and encrypt data transmitted from one or more computers for storage in the memory; and
    a one-way link, coupling the encryption processor to the memory so as to enable the encryption processor to write the encrypted data to the memory but not to read from the memory.

In some embodiments, the encryption processor is configured to encrypt the data using an encryption key that is not available to the one or more computers. In one embodiment, for each transmission of the data from the one or more computers, the encryption processor is configured to select the encryption key from among a plurality of possible encryption keys, and to convey an indication of the selected encryption key to the memory in addition to the encrypted data.

Typically, the memory is configured to store the encrypted data without decryption prior to storage.

In a disclosed embodiment, the encryption processor is configured to receive the data from the one or more computers over a network and to apply a time stamp to each of at least some items of the data that are written to the memory.

In some embodiments, the apparatus includes a monitoring processor, which is coupled to the memory so as to generate an indication of a status of the data stored in the memory, and a further one-way link, coupling the monitoring processor to at least one of the computers so as to enable the monitoring processor to convey the indication of the status to the at least one of the computers but not to receive inputs from the one or more computers.

There is also provided, in accordance with an embodiment of the present invention, a method for data storage, including:
    receiving data transmitted from one or more computers for storage in a memory;
    encrypting the received data using an encryption processor before passing the data to the memory;
    conveying the encrypted data from the encryption processor to the memory over a one-way link, which permits the encryption processor to write the encrypted data to the memory but not to read from the memory; and
    storing the encrypted data in the memory.

The present invention will be more fully understood from the following detailed description of the embodiments thereof, taken together with the drawings in which:

BRIEF DESCRIPTION OF THE DRAWINGS

FIG. 1 is a block diagram that schematically illustrates a system for data transmission and storage, in accordance with an embodiment of the present invention.

DETAILED DESCRIPTION OF EMBODIMENTS

FIG. 1 is a block diagram that schematically illustrates a system 20 for data transmission and storage, in accordance with an embodiment of the present invention. Computers 24 in system 20 write data to a secure archive 22 via a computer network 26. These data may comprise, for example, transaction logs or other data logging entries, database updates, file backups, or substantially any other type of data that may be subject to archiving. Network 26 may comprise substantially any sort of private or public network. (In an alternative embodiment, not shown in the figures, archive 22 may be connected by a single link rather than through a multi-computer network.) Even when access to network 26 is carefully controlled, however, unauthorized users may still be able to gain access to the network. Such users may attempt to introduce malicious program code into archive 22 in order to read data stored in the archive or to corrupt the contents of the archive. For example, an attacker who has hacked into the network might try to erase or alter the IT system log in order to cover his tracks.

Archive 22 comprises an encryption processor 28, which writes encrypted data to a memory 30 via a one-way link 32. Computers on network 26 are able to write data to memory 30 only via the encryption processor. Therefore, any malicious program code that a user may attempt to introduce into archive 22 will be scrambled by encryption and will simply be stored in scrambled form in memory 30. Consequently, the user will be unable to cause the control unit of memory 30 to perform any action other than simply writing data to the memory, since any program instructions submitted by the user will be rendered unintelligible by the encryption.

Encryption processor 28 may comprise either dedicated hardware or a general-purpose, software-driven computer processor, or a combination of hardware and software elements. For rapid encryption, as well as enhanced security, for example, the encryption processor may comprise one or more gate arrays with suitable firmware and/or an application-specific integrated circuit (ASIC). If a general-purpose computer processor is used, the software for carrying out the functions described herein may be downloaded to the processor over a network, or it may be alternatively provided on tangible media, such as optical, magnetic, or electronic memory media.

The encryption processor may use any suitable sort of encryption that is known in the art, including both asymmetric encryption methods, such as the RSA (Rivest Shamir Adelman) algorithm, and symmetric methods, such as the DES (Data Encryption Standard) and AES (Advanced Encryption Standard) algorithms, as well as simpler methods, which are sometimes referred to as "scrambling." In encrypting incoming data, the encryption processor typically uses different keys at different times, and may use a key that is not available to computers outside archive 22. Because of the changing keys, hackers are prevented from using a known key to prepare their transmissions in such a way as to have malicious effect after encoding. Typically, the encryption processor chooses the key for each data item or group of data items using a pseudo-random process, either by selection from a list that was prepared in advance, or by pseudo-random generation. (Alternatively, the key may be chosen deterministically, as long as it is not known or available to the sending computer.) The key may be of any suitable length, depending on the encryption algorithm that is used.

Encryption processor 28 transmits the encrypted data over one-way link 32 to memory 30. Assuming that the encryption processor uses different encryption keys at different times, the encryption processor may also transmit to the memory an indication of the key that is to be used to decrypt each transmission. The indication may comprise either the key itself or an index to a predetermined list of keys. Optionally, either the encryption processor or the memory controller (or both) may add a time-stamp to each item of data, in order to facilitate audit functions. Alternatively or additionally, the time stamp may be applied by a dedicated hardware unit.

One-way link 32 may comprise a Waterfall link, as described in the Background section above, or any other suitable type of one-way link that is known in the art. As noted above, this link is typically physically configured so as to permit data transmission in only one direction, from processor 28 to memory 30. Optionally, link 32 may comprise two or more one-way links connected in series, with a data security engine placed between the one-way links. This link configuration, which provides enhanced security, is described, for example, in PCT Patent Application PCT/IL2006$_{[DK1]}$/001499, filed Dec. 28, 2006, which is assigned to the assignee of the present patent application and whose disclosure is incorporated herein by reference.

Memory 30 may comprise any suitable type of storage device, such as magnetic, optical, or electronic memory, or a combination of these memory types. The storage device may comprise a control unit (not shown), as is known in the art, which receives the encrypted data over link 32 and writes the data to appropriate locations in the memory. As noted above, however, the control unit does not attempt to decrypt the data before writing. Rather, the data are typically decrypted and "sterilized" offline, as needed, by a separate decryption processor (not shown). To decrypt the data, this processor uses the key that was indicated by the encryption processor, as explained above. After decryption, the decryption processor sterilizes the data in order to detect and neutralize any malicious content, such as viruses, worms and spyware, for example. Methods that can be used for encryption and decryption of potentially-malicious data transmissions are described in greater detail in PCT Patent Application PCT/IL2007/001070,$_{[DK2]}$ filed Aug. 29, 2007, which is assigned to the assignee of the present patent application and whose disclosure is incorporated herein by reference.

Some archiving applications may require archive 22 to return an acknowledgment or other status indicator to one or more of computers 24 after receiving data from the computer. Simple data acknowledgments may be returned by encryption processor 28. Alternatively or additionally, an optional monitoring processor 34 may monitor the status of memory 30 and report on data storage status. Typically, the monitoring processor is pre-programmed to carry out these functions and performs the functions without receiving explicit commands to do so from computers on network 26. Monitoring processor 34 conveys the reports via a one-way link 36 to an output interface 38, which then transmits the reports to the appropriate computer 24 on network 26. In this configuration, computers 24 are unable to send inputs, such as data or commands, to the monitoring processor, and are thus prevented from introducing malicious program code that could cause this processor to retrieve and transmit confidential data from memory 30 or otherwise tamper with the contents of the memory.

Although FIG. 1 shows a certain configuration of system 20 and particularly of the elements in archive 22, the principles of the present invention may similarly be applied in other sorts of physical configurations. For example, links 32 and 36 may be combined in a single package with appropriate connections and switching to ensure that data flows over the links only in the directions and operational modes that are described above. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. Storage apparatus, comprising:
an archive memory centrally archiving data for a plurality of computers;
a processor, which is configured to receive data transmitted from one or more computers for storage in the archive memory; and
a one-way link, coupling the processor to the archive memory so as to enable the processor to write the data to the archive memory but not to read from the archive memory,
wherein the one-way link is physically configured so as to permit data transmission in only one direction, from the processor to the archive memory, and
wherein the archive memory and the processor are connected in a manner allowing direct data flow from the processor to the archive memory, but not from the archive memory to the processor.

2. The apparatus according to claim 1, wherein the processor is configured to receive the data from the one or more computers over a network.

3. The apparatus according to claim 1, wherein the processor is configured to apply a time stamp to each of at least some items of the data that are written to the archive memory.

4. The apparatus according to claim 1, and comprising:
a monitoring processor, which is coupled to the archive memory so as to generate an indication of a status of the data stored in the archive memory; and
a further one-way link, coupling the monitoring processor to a computer separate from the processor to enable the monitoring processor to convey the indication of the status to the computer but not to receive inputs from the computer.

5. The apparatus according to claim 1, wherein the archive memory and the processor are connected directly only by the one way link.

6. The apparatus according to claim 1, comprising an additional one way link included in a communication path allowing transmission from the archive memory to at least one of the computers, without the communication path passing through the processor.

7. The apparatus according to claim 1, comprising a monitoring processor separate from the processor, which monitors the status of the archive memory.

8. The apparatus according to claim 1, wherein the archive memory comprises a centralized archiving storage of a network.

9. The apparatus according to claim 1, wherein the archive memory is configured to only receive data through the processor.

10. The apparatus according to claim 1, wherein the archive memory is located within a private protected computer network such that data can be transmitted to the archive memory only from computers within the private protected network.

11. A method for data storage, comprising:
receiving data transmitted from one or more computers for storage in an archive memory centrally archiving data for a plurality of computers;
conveying the received data from a processor to the archive memory over a one-way link, which permits the processor to write the received data to the archive memory but not to read from the archive memory,
wherein the one-way link is physically configured so as to permit data transmission in only one direction, from the processor to the archive memory, and wherein the archive memory and the processor are connected in a manner allowing direct data flow only from the processor to the archive memory, but not from the archive memory to the processor; and
storing the data in the archive memory.

12. The method according to claim 11, wherein receiving the data comprises receiving the data from the one or more computers over a network.

13. The method according to claim 11, and comprising applying a time stamp to each of at least some items of the data that are written to the archive memory, by the processor.

14. The method according to claim 11, and comprising:
generating an indication of a status of the data stored in the archive memory using a monitoring processor coupled to the archive memory; and
conveying the indication from the monitoring processor to a computer separate from the processor via a further one-way link, which permits the monitoring processor so to convey the indication of the status to the computer but not to receive inputs from the computer.

15. The method according to claim 11, wherein the archive memory and the processor are connected directly only by the one way link.

16. The method according to claim 11, wherein receiving the data comprises receiving transaction logs from the plurality of computers.

17. The method according to claim 11, wherein receiving the data comprises receiving file backups from the plurality of computers.

18. The method according to claim 11, wherein the archive memory is configured to only receive data through the processor.

* * * * *